United States Patent [19]
Guzorek

[11] Patent Number: 5,662,309
[45] Date of Patent: Sep. 2, 1997

[54] AIR INTAKE ASSEMBLY FOR A COMBUSTION FUEL BURNER HAVING AN ADJUSTABLE AIR INTAKE PORT

[75] Inventor: Steven E. Guzorek, Kinston, N.C.

[73] Assignee: Pettibone Corporation, Lisle, Ill.

[21] Appl. No.: 518,091

[22] Filed: Aug. 22, 1995

[51] Int. Cl.⁶ .................................................. F16K 31/44
[52] U.S. Cl. ........................................ 251/212; 431/265
[58] Field of Search ............................. 251/212; 431/265

[56] References Cited

U.S. PATENT DOCUMENTS

| | | | |
|---|---|---|---|
| 2,884,005 | 4/1959 | Kamp et al. | 137/601 |
| 3,068,891 | 12/1962 | Panning et al. | 251/212 |
| 3,396,904 | 8/1968 | Jahette | 251/212 |
| 4,140,476 | 2/1979 | Kaplan | 431/265 |
| 4,188,862 | 2/1980 | Douglas | 251/212 |
| 4,373,901 | 2/1983 | Kaplan et al. | 431/186 |
| 4,388,064 | 6/1983 | Kaplan et al. | 431/265 |
| 4,397,631 | 8/1983 | Fisher | 431/114 |
| 4,424,793 | 1/1984 | Cooperrider | 126/110 B |
| 4,482,291 | 11/1984 | Chakrawarti et al. | 415/25 |
| 4,595,355 | 6/1986 | Garrelfs et al. | 431/265 |
| 4,680,006 | 7/1987 | Fisher | 431/265 |
| 4,701,123 | 10/1987 | Tallman et al. | 431/171 |
| 5,174,743 | 12/1992 | Wellman et al. | 431/187 |
| 5,184,949 | 2/1993 | O'Brien | 431/189 |

FOREIGN PATENT DOCUMENTS

| | | |
|---|---|---|
| 26 54 174 | 6/1978 | Germany . |
| 911685 | 11/1962 | United Kingdom . |

*Primary Examiner*—Carroll B. Dority
*Attorney, Agent, or Firm*—McDermott, Will & Emery

[57] ABSTRACT

An air intake assembly for a combustion oil burner, the assembly comprises a housing having a front wall, a back wall and a peripheral side wall between the front wall and the back wall, the housing defining an air intake chamber therein, the front wall having a partly circular air intake hole therein, an axle mounted to the housing between the front and the back walls, first, second and third rotatable vanes rotatably mounted to the axle and positioned adjacent to the air intake hole, the first rotatable vane is fixedly attached to the axle, and a mechanism mounted on the rotatable vanes for sequentially rotating the rotatable vanes whereby the air intake hole can be selectively opened from 0° open where substantially no air can pass through the hole and into the air intake chamber, to approximately 270° open where air can flow into the chamber.

11 Claims, 8 Drawing Sheets

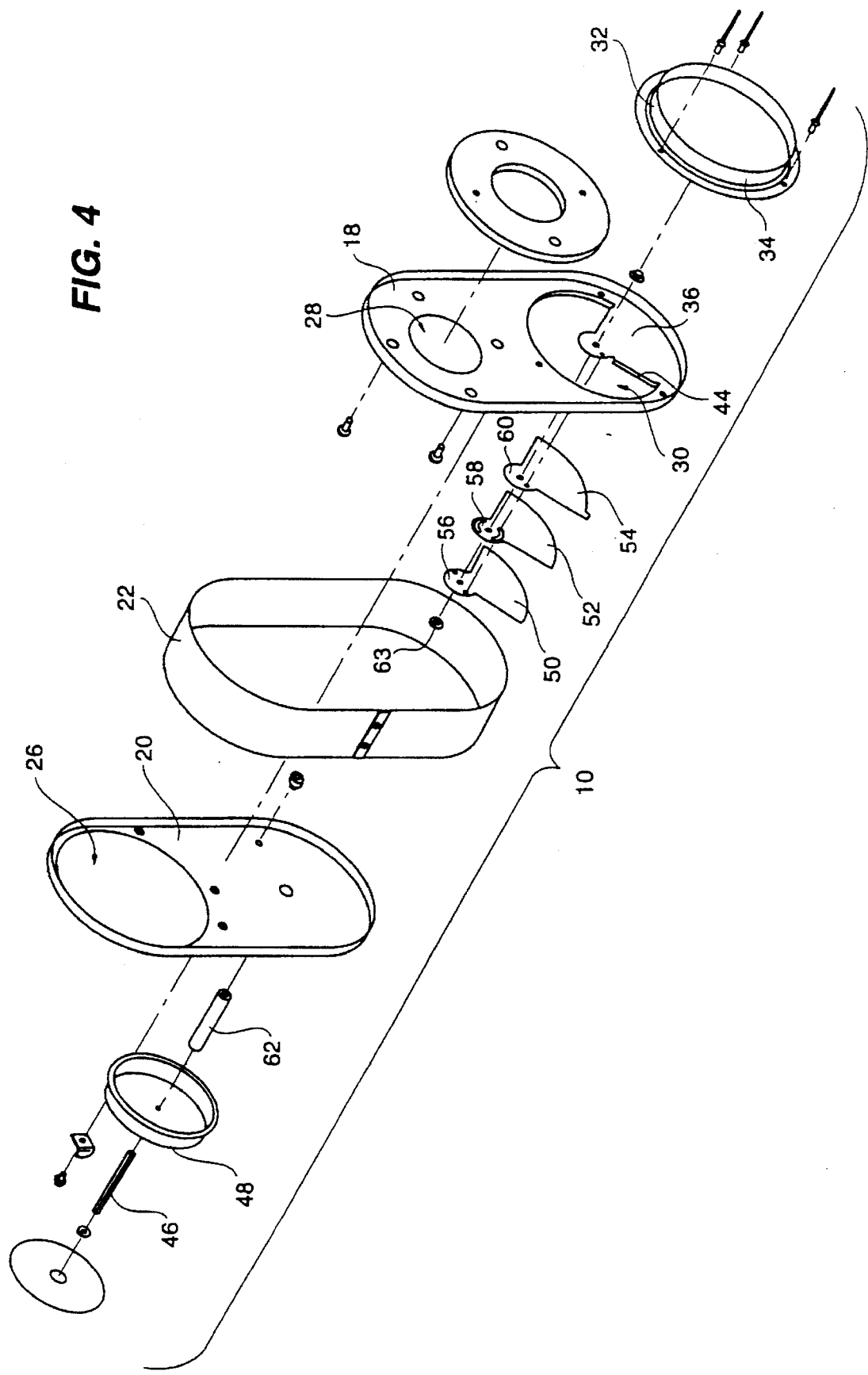

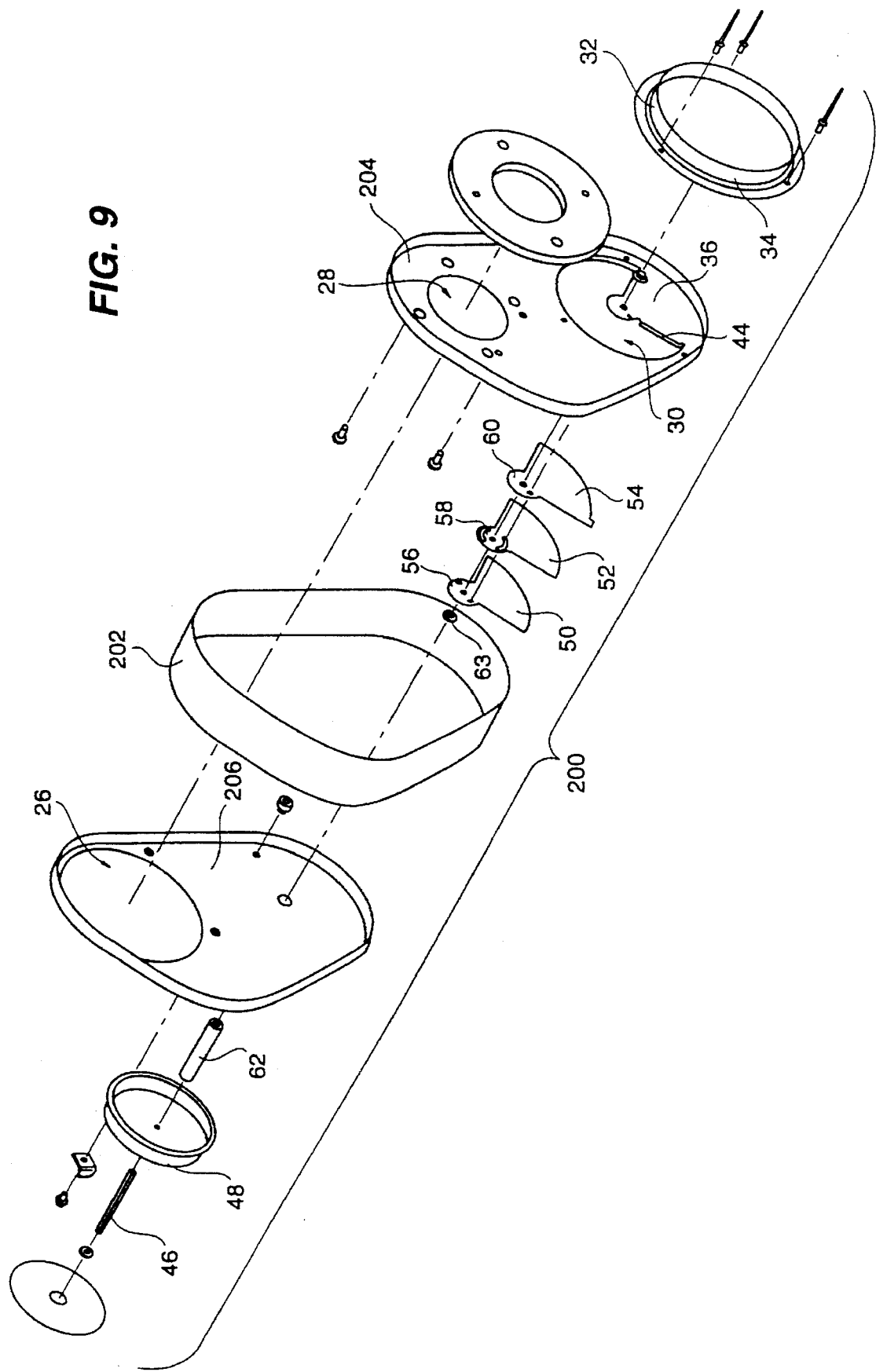

1

AIR INTAKE ASSEMBLY FOR A COMBUSTION FUEL BURNER HAVING AN ADJUSTABLE AIR INTAKE PORT

BACKGROUND OF THE INVENTION

1. Field of the Invention

The present invention relates to an air intake assembly and, more particularly, to an air intake assembly for regulating the amount of air that is drawn into a combustion fuel burner.

2. Background Art

Combustion fuel burners generally include a fuel supply which supplies oil to the burner, an air tube for mixing air with the fuel and forming a fuel-air mixture and an ignition for igniting the fuel-air mixture. Air is provided to the air tube from outside the burner through an air intake boot. The air intake boot is connected to the burner and controls the amount of air that is provided to the burner to be mixed with the fuel. By precisely controlling the amount of air to the burner, the flame and heat intensity of the burner may be controlled.

Previous air intake boots have turn dampers which rotate about an axis that is in the plane of an opening. These air intake boots are designed to be installed in a horizontal position only. Such air intake boots cannot be precisely adjusted at low firing rates because the opening is nonplanar due to the double sided damper rotating about the axis. These air boots also do not provide smooth air flow to the burner.

Another example of an air gate for controlling air through an air intake duct is shown in U.S. Pat. No. 5,184,949. The gate is controlled by a dial located on the housing of the burner. The gate is rotated about a shaft and adjusts the amount of air which travels through the passage.

In an unrelated field of controlling air flow out of heating ducts, registers have been provided which use rotatable segments to regulate the opening of an air duct for controlling the amount of air that is allowed to flow into a room. Assemblies having rotatable segments have not been used in connection with the precise regulation of air flow to an oil burner.

Other systems are currently known for regulating the amount of air drawn into a combustion oil burner, but these systems likewise have drawbacks which demonstrate the need for an improved air intake boot.

SUMMARY OF THE INVENTION

It is one of the principal objectives of the present invention to provide an air intake assembly that can precisely regulate the amount of air flowing into a combustion oil burner and to make the air intake assembly reliable and easily installed on a burner.

More particularly, in one form of the invention, an air intake assembly for a combustion oil burner is provided having a housing with a front wall, a back wall and a peripheral side wall between the front wall and the back wall and the housing defines an air intake chamber therein. The front wall has a partly circular air intake hole therein. The assembly further comprises an axle mounted to the housing between the front and the back walls and first, second and third rotatable vanes rotatably mounted to the axle and positioned adjacent to the air intake hole. A mechanism is mounted on the rotatable vanes for sequentially rotating the rotatable vanes whereby the air intake hole can be selectively opened from 0° open where substantially no air can pass through the hole and into the air intake chamber, to approximately 270° open where air can flow into the chamber.

It is still another object of the invention to provide an air boot that can be installed in either a horizontal or vertical position.

It is a further object of the invention to provide a linear opening in the air boot to provide smooth air flow into the burner.

BRIEF DESCRIPTION OF THE DRAWINGS

FIG. 4 is an exploded perspective view of the air intake assembly shown in FIG. 1.

FIG. 5b is a side sectional view of the first rotatable vane taken along the line 5B—5B of FIG. 5a.

FIG. 7b is a side sectional view of the third rotatable vane taken along the line 7B—7B of FIG. 7a.

FIG. 9 is an exploded view of an a second embodiment of an air intake assembly.

DESCRIPTION OF THE PREFERRED EMBODIMENT(S)

Figure 1:
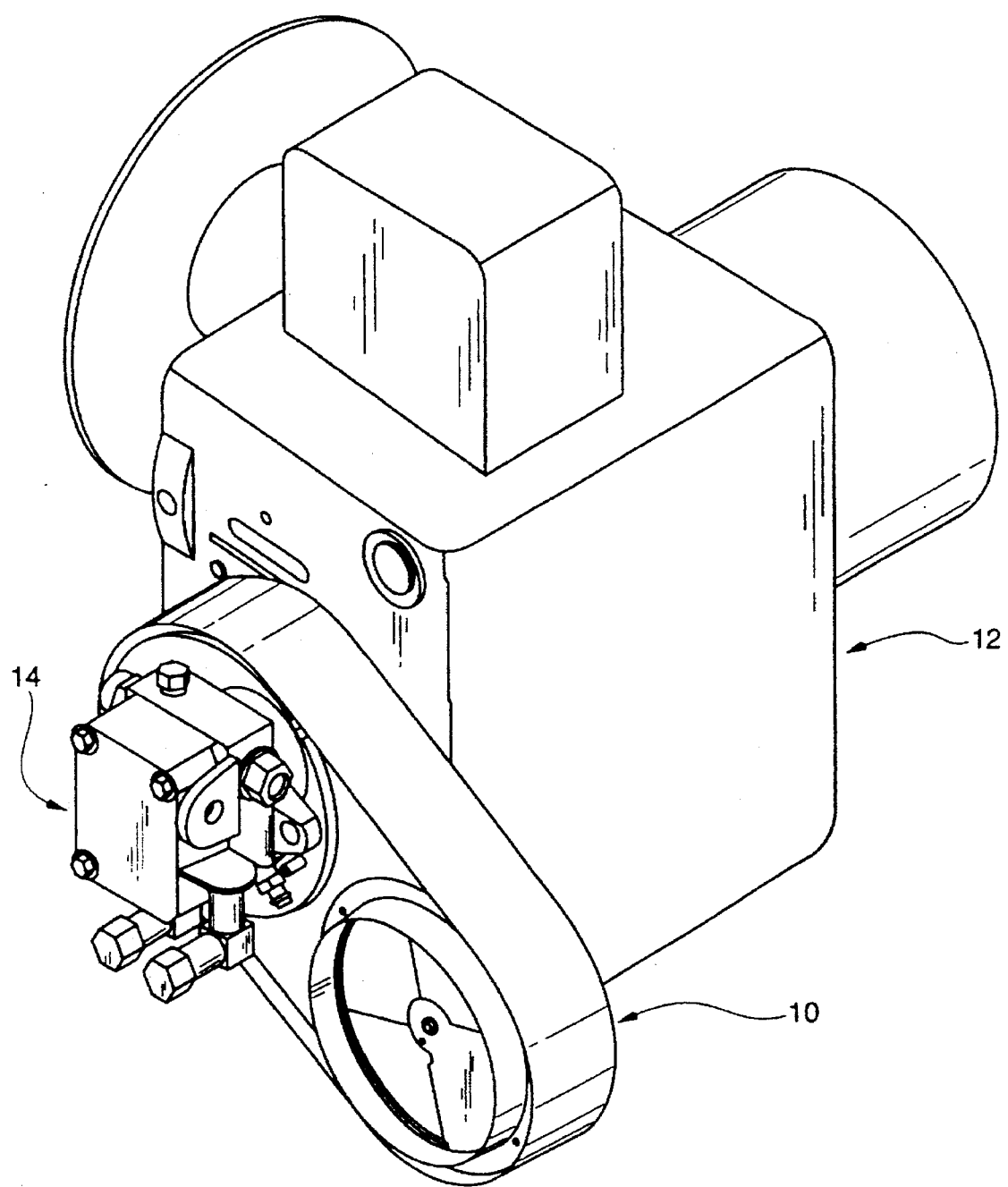
FIG. 1 is a perspective view of one embodiment of an air intake assembly mounted on a combustion oil burner.

Referring now to FIG. 1, there is shown an air intake assembly 10 mounted on a combustion oil burner 12 which is used to heat commercial and/or residential buildings. An oil pump 14 which pumps oil into the oil burner 12 is mounted to the air intake assembly 10.

Figure 3:
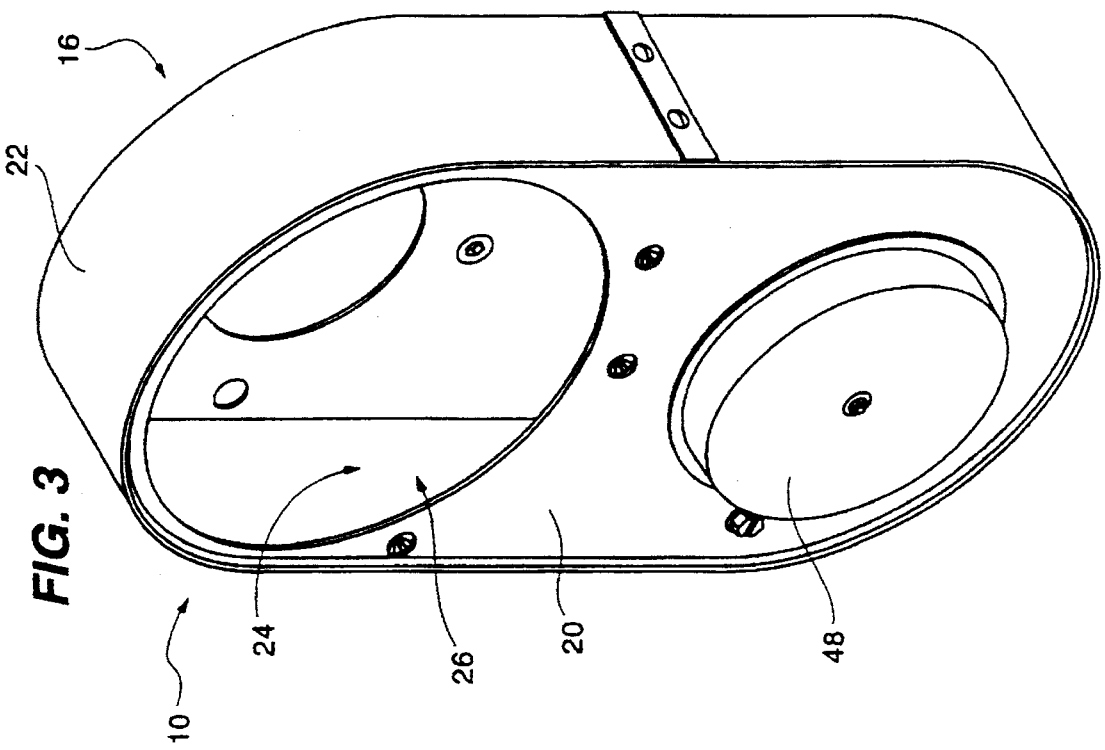
FIG. 3 is a rear perspective view of the air intake assembly shown in FIG. 1.
Figure 2:
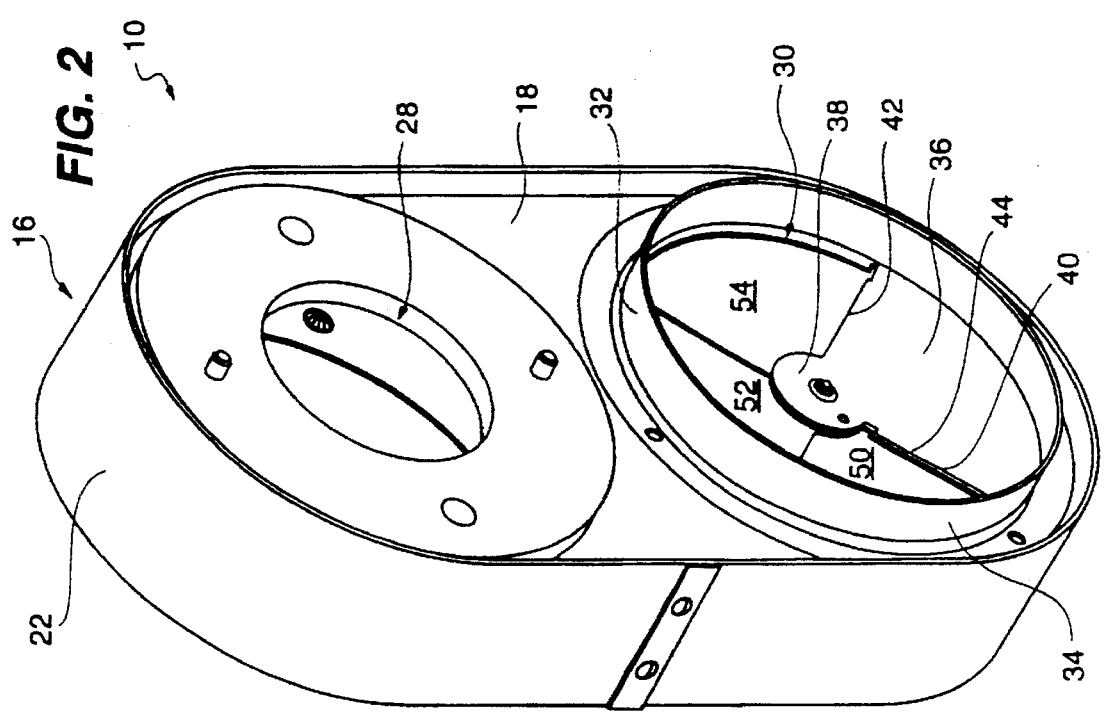
FIG. 2 is a front perspective view of the air intake assembly shown in FIG. 1.

As shown in FIGS. 2 and 3, the air intake assembly 10 includes a housing 16 having a front wall 18, a back wall 20 parallel to and spaced apart from the front wall 18, and a side wall 22 between the front and back walls 18 and 20. The side wall 22 extends around the perimeter of the front and back walls 18 and 20. The front wall 18, back wall 20 and side wall 22 define an air intake chamber 24 within the housing 16. The back wall 20 of the housing 16 has an opening 26 therein which allows the air intake chamber 24 to communicate with the interior of the oil burner 12.

The front wall 18 of the housing 16 has two openings 28, 30 therein. The first opening 28 allows the oil pump which is mounted to the housing to communicate with the air intake chamber 24. The second opening 30 is an air intake opening 30 and allows air to flow into the air intake chamber 24. A circular flange 32 surrounds the second opening 30 and has an annular mounting surface 34 so that an air pipe or tube (not shown) can be brought up to and secured to the air intake flange 32.

The second opening 30 is partly circular or C-shaped, as shown, and spans approximately 270° of a circle. A partly circular portion 36 of the front wall 18 extends to the center of the circle defined by the partly circular air intake opening 30. The partly circular front wall portion 36 covers approximately a 90° section of the opening 30, and prevents the opening 30 from being completely circular.

The partly circular portion 36 of the front wall 18 has a generally circular hub 38 located at the center of the opening 30. Two side edges 40, 42 of the front wall portion 36 extend radially outwardly from the hub 38 to the remaining portion of the front wall 18. One of the side edges 40 has a stop flange 44 thereon. The stop flange 44 is described below with reference to the operation of the assembly 10.

Although the opening 30 is shown a partly circular, note that the opening can be fully circular, and a partly circular wall (not shown) which is separate from the front wall 18, can be mounted to the front wall 18 and fixed in place, blocking a portion of the fully circular opening.

In the exploded view of the assembly 10 in FIG. 4, an axle 46 is shown which, when assembled, is mounted between the back wall 20 of the housing 16 and the circular hub 38 of the front wall 18. The axle 46 is positioned along a central axis of the hub 38. The axle 46 is also connected to a knob 48 which as shown in FIG. 3 is located adjacent the rear wall 20 of the housing 16.

Three rotatable vanes 50, 52, 54, are mounted on the axle 46. The first rotatable vane 50 is positioned farthest from the front wall 18. The second rotatable vane 52 is positioned adjacent the first rotatable vane 50 and closer to the front wall 18. The third rotatable vane 54 is positioned between the second rotatable vane 52 and the front wall 18.

The three rotatable vanes 50, 52, 54 are partly circular and each covers approximately a 90° section of the air intake opening 30. Each rotatable vane 50, 52, 54 has a circular central hub portion 56, 58, 60 and, when assembled, the central axis of each circular hub portion 56, 58, 60 is aligned. Also, the axle 46 extends through the center of each hub portion 56, 58, 60. The rotatable vanes 50, 52, 54 are mounted on the axle 46 and are positioned between a collar 62 which is placed around the axle 46 and the front wall 18. The rotatable vanes 50, 52, 54 are also held in place adjacent to the air intake opening 30 by the collar 62 which prevents the vanes 50, 52, 54 from moving along the axle 46 and a resilient spring 63. The spring 63 is positioned between the collar 62 and the first rotatable vane 56 and prevents a gap from forming between the vanes 50, 52, 54 and 36 by forcing the vanes 50, 52, 54 and 36 together along an axis parallel to the axle and adjacent the front wall portion 36. The first vane 50 is fixed to the axle 46 and therefore directly rotates with the axle 46.

Figure 5A:
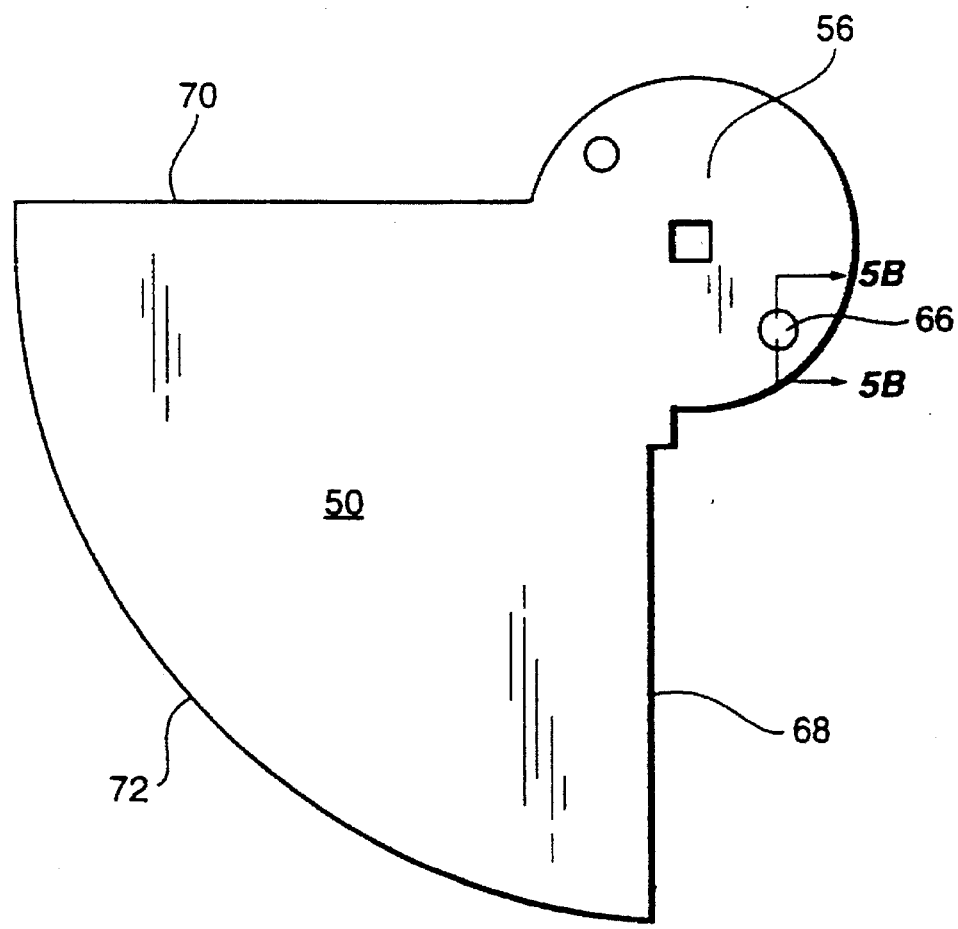
FIG. 5a is a front view of a first rotatable vane of the air intake assembly.
Figure 5B:
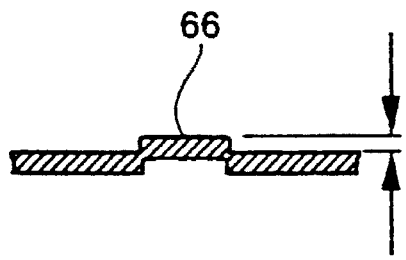
Figure 6:
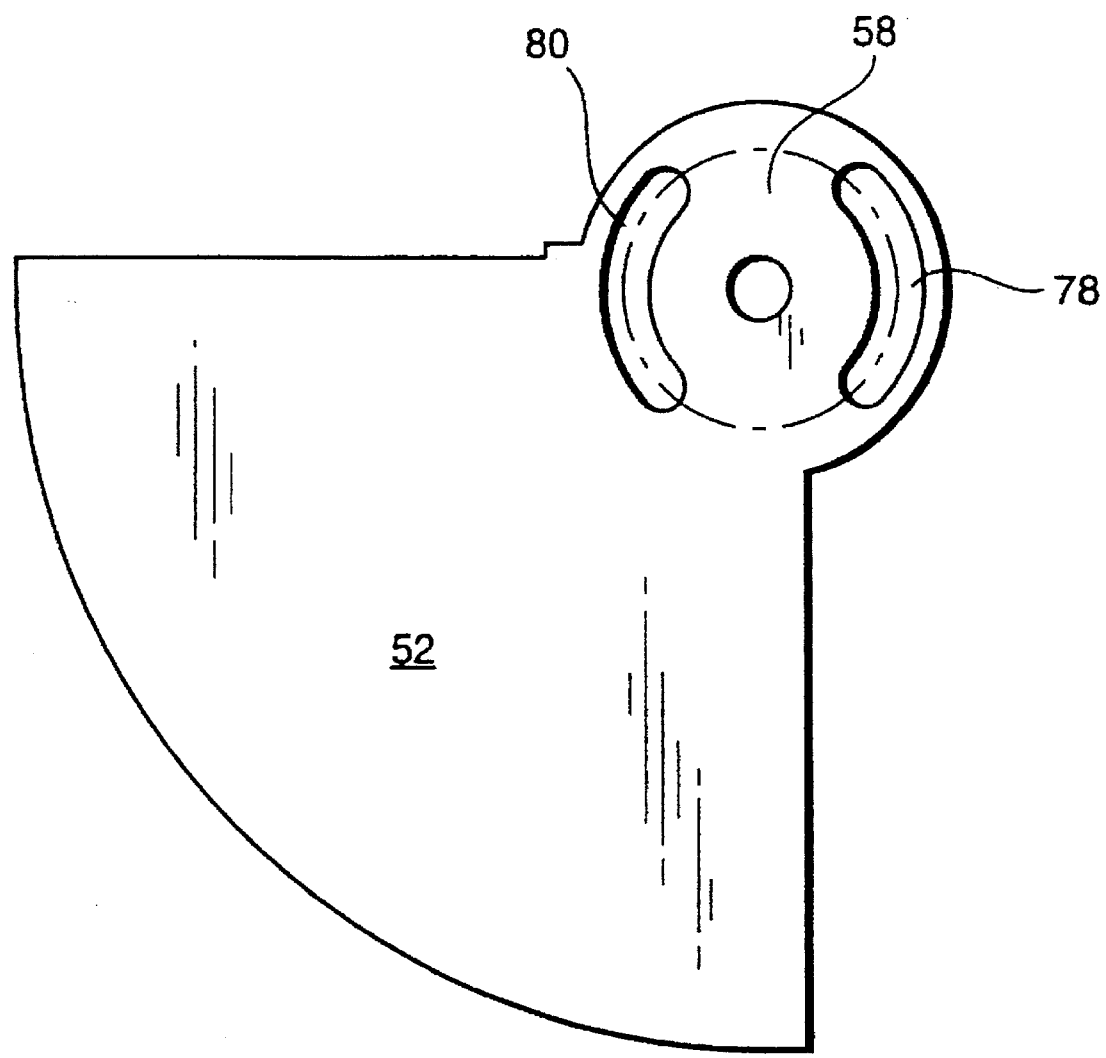
FIG. 6 is a front view of a second rotatable vane of the air intake assembly.
Figure 7A:
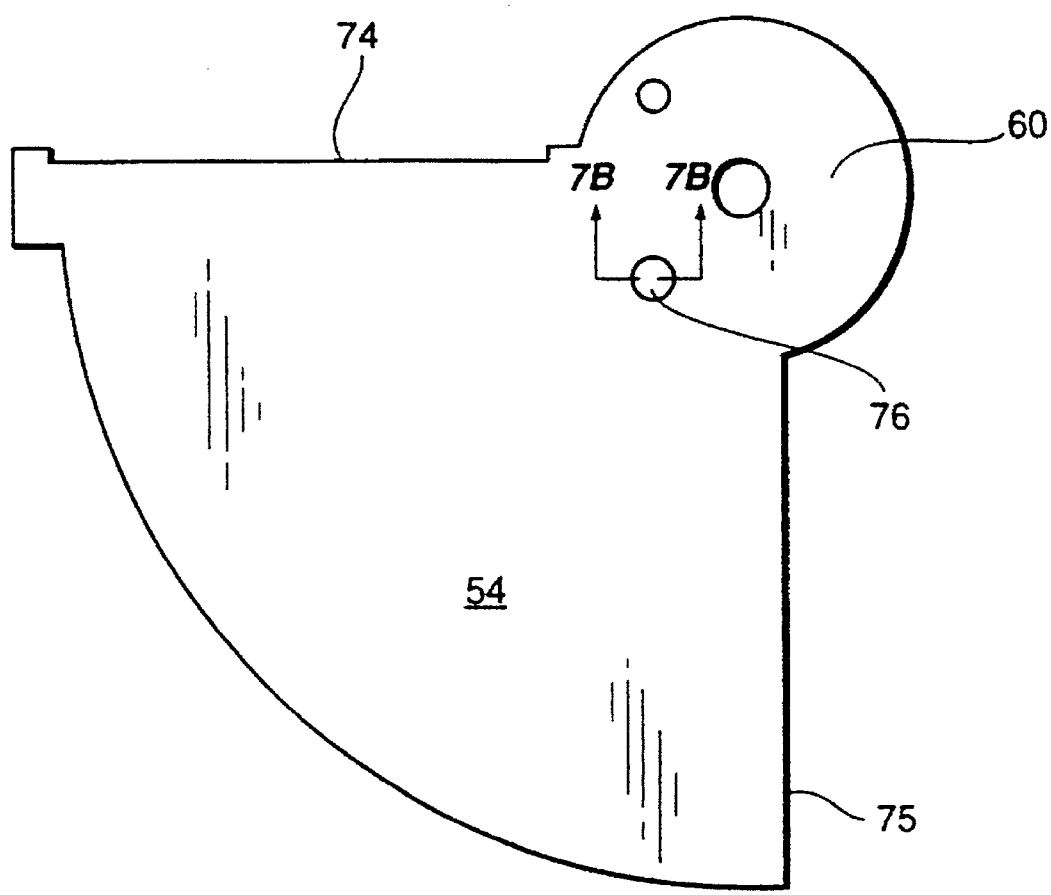
FIG. 7a is a front view of a third rotatable vane of the air intake assembly.
Figure 7B:
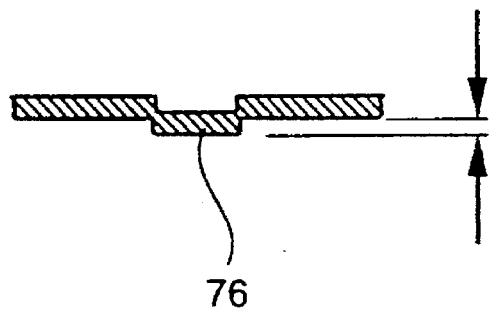

Referring now to the rotatable vanes 50, 52, 54 as shown in FIGS. 5–7. The first rotatable vane 50 (FIG. 5a and 5b) has a small tab 66 protruding forwardly from the hub portion 56 toward the second rotatable vane 52. The first rotatable vane 50 also has two edges 68, 70 that extend radially outwardly from the hub portion 56 to an arcuate edge 72 of the vane 50. One of the edges 68 engages the stop flange 44 on the fixed wall 36 when the vane 50 is rotated to a fully closed position.

Likewise, the third rotatable vane 54 (FIG. 7a and 7b) has a small tab 73 protruding rearwardly from its hub portion 60 toward the second vane 52. The third rotatable vane 54 also has two edges 74, 75. Edge 74 engages the stop flange 44 on the fixed wall 36 when rotated to a fully open position.

The second vane 52 (FIG. 6) has first and second arcuate slots 78, 80 in its circular hub portion 58. The first and second slots 78, 80 receive the tabs 66, 76 of the first and third rotatable vanes 50, 54, respectively. As will be described below, the slot and tab configuration allows the three rotatable vanes 50, 52, 54 to be rotated to precisely adjust and optimize the airflow into the air intake chamber 24.

Referring now to FIGS. 8a to 8f, the movement and operation of the three rotatable vanes 50, 52, 54 with respect to the fixed, front wall 36 will be described. When the three rotatable vanes 50, 52, 54 and the partly circular front wall portion 36 are in a first or closed position (FIG. 8a), the vanes 50, 52, 54 and front wall portion 36 form a complete circle. A small portion of each vane overlaps a portion of the vane or vanes directly adjacent it. When the vanes 50, 52, 54 are in the first or closed position, the air intake opening 30 is blocked and air is prevented from entering the air intake chamber 24.

Figure 8A:
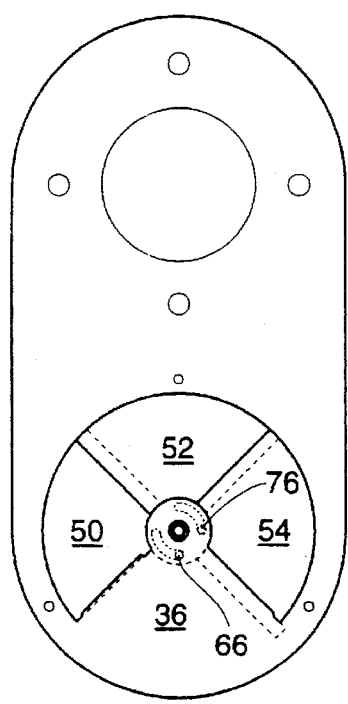
FIGS. 8a–8f are front views of the air intake assembly, showing the rotatable vanes rotated in various positions whereby the air intake port is shown in various stages of opening ranging from fully opened to fully closed.
Figure 8B:
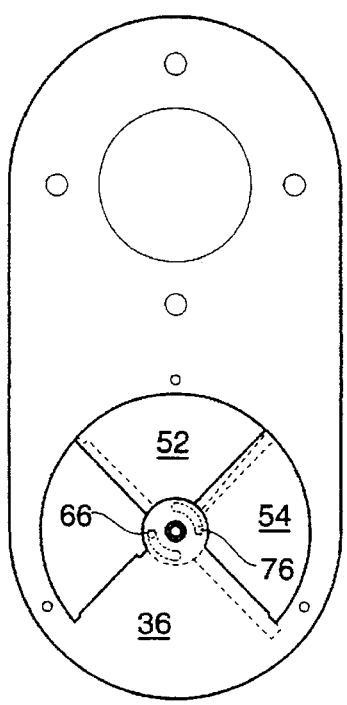
Figure 8C:
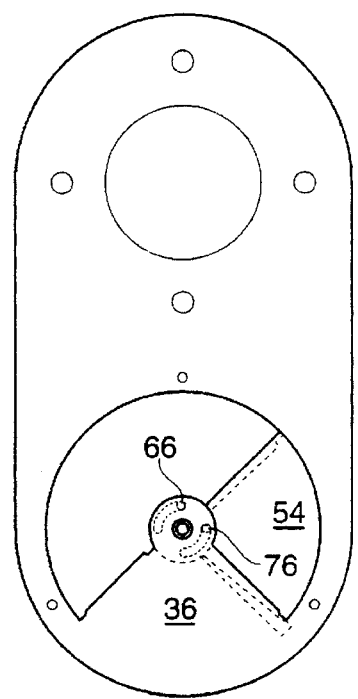
Figure 8D:
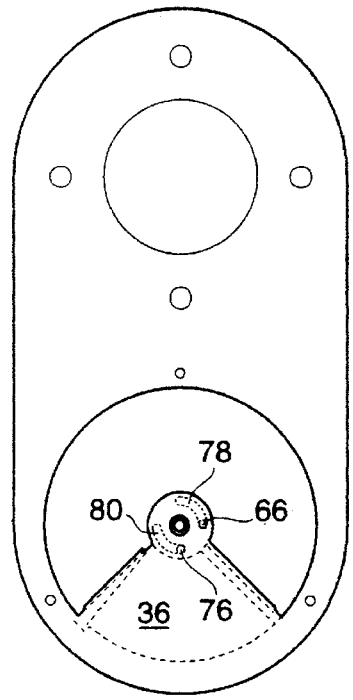
Figure 8E:
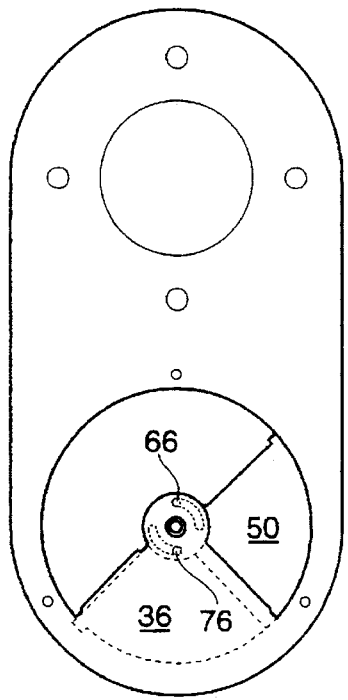
Figure 8F:
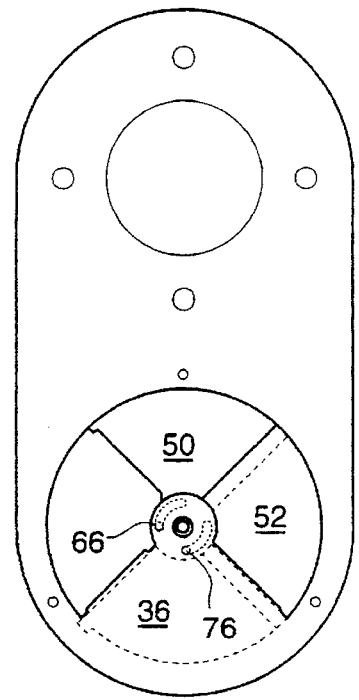

When the knob 48 is rotated in a first direction, the first vane 50 rotates about the axle 46 and is rotated from the first position to a second position so that the first vane 50 is partially or fully positioned behind the second vane 52 (See FIG. 8b). In the second position, the air intake opening 30 is approximately 90° open. Note however that rotation of the first vane 50 can be stopped at any point between the first and the second position thereby leaving the air intake opening 30 open between 0° and approximately 90°.

As the first vane 50 is rotated from the first position to the second position, the first tab 66 slides within the first slot 78 and does not cause the second vane 52 to move. When the first vane 50 reaches the second position, the first tab 66 engages an end of the first slot 78 and continued rotation of the first vane 50 in the first direction causes the second vane 52 to rotate with the first vane 50, due to the first tab 66 pulling on the edge of the first slot 78.

As the first and second vanes 50, 52 rotate together from the second to a third position (FIG. 8c), the second slot 80 in the second vane 52 moves along the second tab 76 on the third vane 54, but does not cause the third vane 54 to rotate. Again, rotation of the first and second vanes 50, 52 can be stopped at any point between the second and third position, causing the air intake opening 30 to be open from between approximately 90° and 180°.

When the first and second vanes 50, 52 have been rotated to the third position, the first and second vanes 50, 52 are almost completely behind the third vane 54 and the second slot 80 engages the second tab 76. Further rotation of the first and second vanes 50, 52 in the first direction also causes rotation of the third vane 54 until all three vanes 50, 52, 54 are in a fourth or fully open position (FIG. 8d) where the air intake opening 30 is open approximately 270°. In the fourth or fully open position, all three rotatable vanes 50, 52, 54 are substantially behind the partly circular fixed wall portion 36. Note again that rotation can be stopped at any point between the third and fourth positions so that the air intake opening 30 can be opened between approximately 180° and 270°.

To close the air intake opening 30 from the fully opened position (FIG. 8d), the knob 48 is rotated in a second direction, opposite the first direction, causing the first vane 50 to move in the second direction as well. The first vane 50 rotates approximately 90° and is rotated out from behind the other vanes 52, 54 and 36 to partially block the air intake opening 30, whereby the air intake opening 30 is 180° open (FIG. 8e), before causing the second vane 52 to rotate in the second direction as well. Similarly, the first and second vane 50, 52 then rotate together approximately 90°, with the second vane 52 being rotated out from behind the third vane 54 and front wall portion 36, whereby the air intake opening 30 is 90° open (FIG. 8f), before causing the third vane 54 to rotate with the first and second vanes 50, 52. Then, all three vanes 50, 52, 54 rotate another approximately 90°, with the third vane 54 being rotated out from behind the front wall portion 36, until the air intake opening 30 is closed (FIG. 8g).

In the fully closed position (FIG. 8f), edge 68 of the first vane 50 abuts against the stop flange 44 of the front wall portion 36 and prevents further rotation of the first vane 50. Again, note that rotation of the vanes 50, 52, 54 can be stopped at any time so that the air intake opening 30 is at the desired degree of opening between approximately 270° and 0°.

Referring now to FIG. 9, an alternate embodiment of an air intake assembly is shown. The air intake assembly 200 shown in FIG. 9 is similar to the assembly 10 shown in FIGS. 1–4 and 8 except that the assembly 200 has a lobe shaped housing 202 and lobe shaped front and back walls 204, 206, rather than the generally oval shaped housing 16 and front and back walls 18, 20 shown in FIGS. 1–4 and 8. Note that all other items shown in FIG. 9 that are the same as those shown and numbered in FIG. 4 are numbered accordingly.

From the foregoing description, it will be apparent that the air intake assembly 10 of the present invention has a number of advantages, some of which have been described above and others of which are inherent in the invention. Also it will be understood that modifications can be made to the air intake assembly 10 described above without departing from the teachings of the present invention. Accordingly, the scope of the invention is only to be limited as necessitated by the accompanying claims.

I claim:

1. An air intake assembly for a combustion oil burner, said assembly comprising:

a housing having a front wall, a back wall and a peripheral side wall between said front wall and said back wall, said housing defining an air intake chamber therein, said front wall having a partly circular air intake hole therein;

an axle mounted to said housing between said front wall and said back wall, first, second and third rotatable vanes rotatably mounted to said axle and positioned adjacent to said air intake hole, said first rotatable vane being mounted in direct rotational movement with said axle;

means mounted on said rotatable vanes for sequentially rotating said rotatable vanes whereby said air intake hole can be selectively opened from 0° open where substantially no air can pass through said hole and into said air intake chamber, to approximately 270° open where air can flow into the chamber.

2. The assembly of claim 1 wherein said means for sequentially rotating said rotatable vanes includes:

first and second arcuate slots on said second rotatable vane;

a first tab on said first vane extending toward said second vane and into said first slot;

a second tab on said third vane extending toward said second vane and into said second vane.

3. The assembly of claim 1 wherein said first, second and third rotatable vanes each have a circular hub portion, said axle passing through the center of each circular hub portion;

said slots on said second vane are located on said central hub portion of said second rotatable vane; and said tabs on said first and said third vanes are located on said central hub portions of said first and third rotatable vanes.

4. The air intake assembly of claim 1 further comprising axle rotating means for rotating said axle.

5. The air intake assembly of claim 4 wherein said axle rotating means includes a knob mounted to said axle.

6. The air intake assembly of claim 1 further comprising means for preventing said rotatable vanes from sliding along said axle and keeping said rotatable vanes adjacent said air intake hole.

7. The air intake assembly of claim 3 wherein said housing has a stop flange adjacent said air intake hole whereby when said first rotatable vane engages said stop flange, rotation of said first vane is prohibited in the second direction.

8. The air intake assembly of claim 3 wherein said housing has a stop flange adjacent said air intake hole whereby when said third rotatable vane engages said stop flange, rotation of said first vane is prohibited in the first direction.

9. An air intake assembly adapted to be mounted to a combustion oil burner comprising:

a housing having a front wall, a back wall and a peripheral side wall therebetween, said front, back and side walls defining a chamber within the housing, said housing having an air intake opening through which air is drawn into said chamber;

rotatable air intake adjusting means for adjustably blocking the air intake opening wherein said opening can be blocked from between approximately 90° to approximately 360°;

said rotatable air intake adjusting means including a partly circular fixed wall extending into said opening and blocking an approximately 90° section of the opening and three partly circular rotatable vanes which rotate about a common axis in a plane generally perpendicular to the axis of the partly circular opening, each of said rotatable vanes being rotatable to variably block the hole, in conjunction with said fixed wall, from 90° to 360°.

10. The assembly of claim 9 wherein said second rotatable vane has two arcuate slots therein, said first vane has a first tab extending toward said second vane and into said first slot and said third vane has a second tab extending toward said second vane and into said second slot;

and further comprising drive means for rotatably driving said first vane about the axis whereby when said first vane rotates about said axis in a first direction from a first or closed position, said tab on said first vane moves within one of said slots until said first tab engages an end of said slot, and, upon further rotation of said first vane, said second vane rotates along with said first vane and causes said second slot to move around said second tab on said third vane until said second slot engages said tab on said third vane and causes said third vane to rotate with said first and said second vanes.

11. A method of adjusting the air flow rate into an air intake assembly of a combustion oil burner having a circular air intake opening, first, second and third partly circular rotatable vanes and a fixed partly circular wall, comprising the steps of:

rotating the first rotatable vane from a first position, where the intake opening is substantially closed and where the first vane is not behind the second vane, to a second position where the first vane is substantially behind the second vane and the opening is open approximately 90°;

rotating the first and the second movable vanes together from the second position, where the first and second vanes are not behind the third rotatable vane, to a third position where the first and second vanes are substantially behind the third rotatable vane and the opening is open approximately 180°;

rotating the first, second and third rotatable vanes together from the third position, where the first, second and third vanes are not behind the fixed wall portion, to a fourth position where the first, second and third vanes are behind the fixed wall and the opening is open approximately 270°.

* * * * *